United States Patent [19]
Rickard et al.

[11] Patent Number: 5,163,715
[45] Date of Patent: Nov. 17, 1992

[54] LINED PIPE CONNECTION DEVICE AND METHOD

[75] Inventors: William M. Rickard; Douglas P. Bouche, both of Palm Desert; William C. Allen, Pasadena; Stephen Pye, Los Angeles, all of Calif.

[73] Assignee: Union Oil Company of California, dba UNOCAL, Los Angeles, Calif.

[21] Appl. No.: 414,671

[22] Filed: Sep. 29, 1989

[51] Int. Cl.$^5$ .............................................. F16L 9/14
[52] U.S. Cl. .................................. 285/55; 285/286; 285/917
[58] Field of Search ................. 285/55, 915, 286, 917, 285/47

[56] References Cited

U.S. PATENT DOCUMENTS

| | | | |
|---|---|---|---|
| 4,288,105 | 9/1981 | Press | 285/55 |
| 4,406,480 | 9/1983 | Izzi | 285/915 X |
| 4,407,516 | 10/1983 | Le et al. | 285/917 X |
| 4,527,818 | 7/1985 | Rundell | 285/917 X |
| 4,560,188 | 12/1985 | Bertt et al. | 285/47 |
| 4,611,833 | 9/1986 | Lescault | 285/286 X |
| 4,620,660 | 11/1986 | Turner | 285/286 X |
| 4,640,532 | 2/1987 | Pope | 285/47 X |
| 4,659,118 | 4/1987 | Schwyter et al. | 285/55 |

OTHER PUBLICATIONS

*Aerospace Fluid Component Designer's Handbook,* vol. 1, Revision D, TRW Systems Group, Howell et al., ed., pp. 6.3.3-2,3, 1970.
API Recommended Practice 10E (RP10E), Second Ed. Jul. 1, 1987, "Recommended Practice for Application of Cement Lining to Steel Tubular Goods, Handling, Installation and Joining", American Petroleum.
AWWA C205-85, Edition Approved Jun. 23, 1985, "AWWA Standard for Cement-Mortar Protective Lining and Coating for Steel water Pipe-4 in. and larger--Shop Applied" American Waterworks Association.
"Design and Fabrication of Polymer Concrete-Lined Pipe for Testing Geothermal Energy Processes", Final Report, Dec. 1981, by Polymer Concrete Research, Inc., Albert O Keading.
"Perma Couple Pipeline Coulpings", Flexweight Corporation Date Unknown.
"TFP & TFT Metal Lined Pipe and Tubing", Kawasaki Heavy Industries, 1983.

*Primary Examiner*—Randolph A. Reese
*Assistant Examiner*—J. Russell McBee
*Attorney, Agent, or Firm*—Gregory F. Wirzbicki; William O. Jacobson

[57] ABSTRACT

A butt welded and lined flange connector allows the joining of pipe sections lined with a brittle material. Spacing and a sleeved liner at the weld end protects the liner during butt welding. A conventional flange face gasket is modified to protrude into the lined zone to perform a dual sealing function. Like conventional flanged joints, the modified gasket forms a seal sandwiched between the flange interface surfaces. However, departing from current practice, the single gasket also fills the gap and seals the liner edges, protecting the pipe sections from the flowing materials. The invention avoids separate putty-like or elastomeric liner seals as well as exotic liner surface configurations. The present invention is expected to be tolerant of severe conditions and cost effective in many applications.

21 Claims, 2 Drawing Sheets

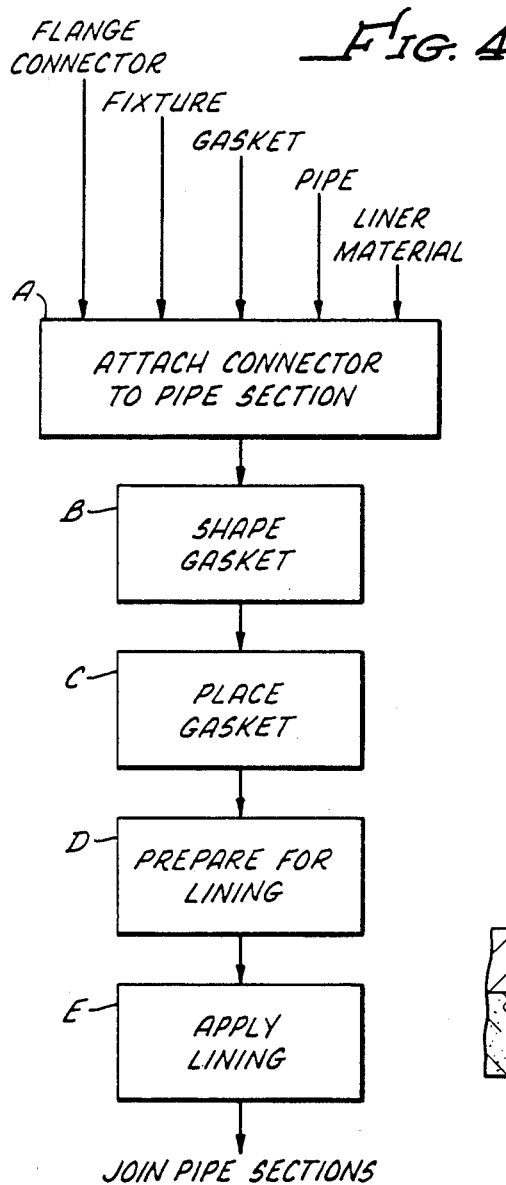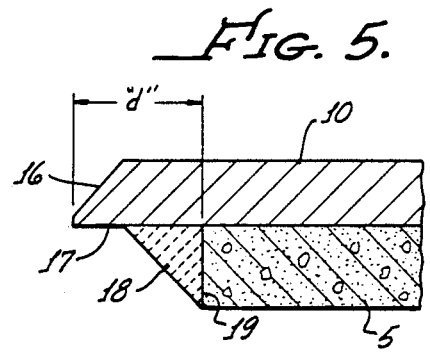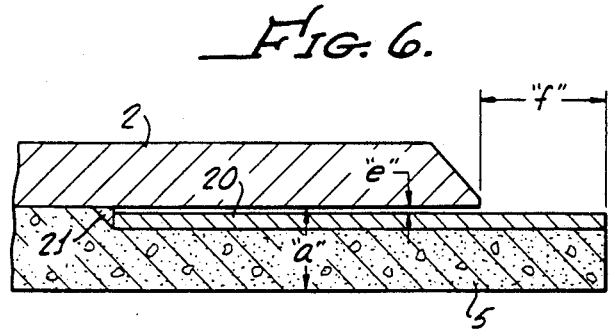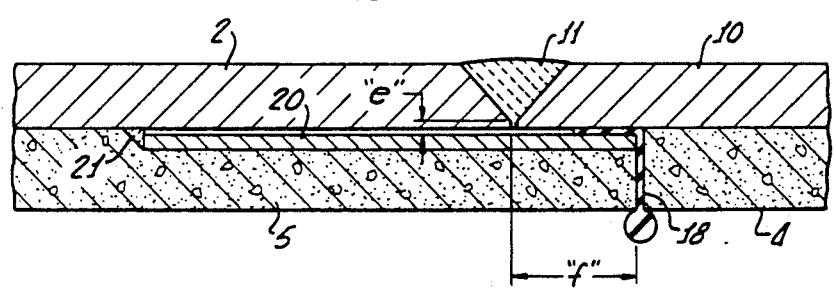

LINED PIPE CONNECTION DEVICE AND METHOD

FIELD OF THE INVENTION

This invention relates to pipe connection devices. More specifically, the invention is concerned with lined flange connectors for joining lined pipe sections.

BACKGROUND OF THE INVENTION

Many piping system applications in chemical and natural resource recovery industries involve corrosive, erosive, scaling or otherwise hard-to-handle fluids. One economic approach to handling these difficult fluids is to cover (or line) the interior of low cost, non-fluid-resistant pipe with a fluid-resistant liner. The composition of the resistant liner may be an inert, but brittle material, such as concrete. These brittle linings are supported by the tougher, but non-resistant pipe material, such as low carbon steel.

The supported lining material must be able to structurally withstand the severe fluid and operating environments in critical areas, such as at joints. The severe environments tend to chip, spall, crack, pit, and delaminate the lining at these critical points. These problems become especially troublesome at liner edges in certain types of joints. For example, flanged joints may need to be periodically opened for inspection, cleaning, or testing, adding further structural demands on the liner edges at these critical areas.

The primary objectives of a lined pipe joint are to: 1) allow assembly of lined pipe sections; 2) seal the joined pipe sections; 3) prevent exposure of non-resistant piping material to the harsh flowing materials; and 4) structurally withstand a variety of operating environments. If the joint is removable, joint disassembly capability is also required. The lined pipe joint device should also be light weight, rugged in construction, easy to maintain, pleasing in appearance, safe, reliable, and low in cost.

Most of the current lined pipe joints may do some of these objectives well, but other objectives may be accomplished poorly or not at all. Removable engagement (e.g., threaded joining) of liner edges at the joint may be possible for some types of liners, but is not feasible for brittle or fragile liner materials.

One conventional approach is to cap or join the liner edges to form a continuous liner across the edges. However, this requires internal access to the joint after pipe is joined. A continuous liner eliminates the liner edge problems at the joint, but joint disassembly and reassembly capability is lost or limited.

Where post-joining access is not feasible, another conventional approach is to separately seal the edges of the liner at the joint. One type of liner seal joint adds a deformable putty-like seal. The putty-like sealing material is generally unsupported. This type of sealing material may also set or harden, such as a cement slurry.

The putty-like material may also require internal access assembly. Access may be required for patching, removal of excess material, or inspection. Disassembly and reassembly capability of putty-like material sealed joint is also limited. This type of unsupported, putty-like seal may not be able to withstand elevated temperatures or thermal cycling, high pressures, and erosive or cavitating flowing fluids.

Another type of separately sealed liner joint adds a gasket or other deformable solid seal at the lining interface. A groove or retaining surface may be added to the pipe or lining material to provide support for this type of deformable seal. However, the application limits using an elastomeric material are similar to the those using a putty-like material.

A major problem with these liner seal and alternatives is the necessity of using a separate liner seal component and/or providing separate liner seal surfaces or materials. These approaches all require added liner sealing or piping costs and may adversely affect reliability and safety.

These problems are compounded in a flanged connector which is attached by butt welding to a lined pipe section. The brittle liner must be applied after welding or protected from the extreme heat during welding.

None of the current or alternative approaches known to the inventors eliminates the problem of liner edge exposure without unconventional and separate liner edge protection components or processes. Even with these added components, the reliability of current lined joints exposed to severe environments appears to be limited.

SUMMARY OF THE INVENTION

A lined butt welded and bolted flange connector have a seal ring and gasket that are modified to perform a several functions. The seal ring and gasket extend into the zone of the liner. The seal ring is also welded prior to the flange being lined. Like conventional flanged joints, the flange gasket forms a face seal between the flange/ring interface surfaces. However, departing from current practice, the modified seal ring and gasket also provide common element liner edge sealing and load protection functions. A sleeve is also added to the butt welded end of the connector to protect the liner during welding of the connector to a pipe section.

In its simplest embodiment, the present invention modifies, but adds no new flange end components in order to accomplish these added functions. It achieves a reliable, low cost sealing of lined pipe sections capable of withstanding harsh fluid and operating environments. The invention avoids separate liner face and flange face sealing components.

BRIEF DESCRIPTION OF THE DRAWINGS

FIG. 4 shows the preferred process of assembling the flange connector shown in FIGS. 2 and 3;

FIG. 5 shows a butt weld end of a connector similar to that shown in FIG. 1;

FIG. 6 shows a mating butt weld end of a connector matched to that shown in FIG. 5; and FIG. 7 shows a butt welded connectors shown in FIGS. 6 and 7.

In these FIGS., it is to be understood that like reference numerals refer to like elements or features.

DESCRIPTION OF THE PREFERRED EMBODIMENT

Figure 1:
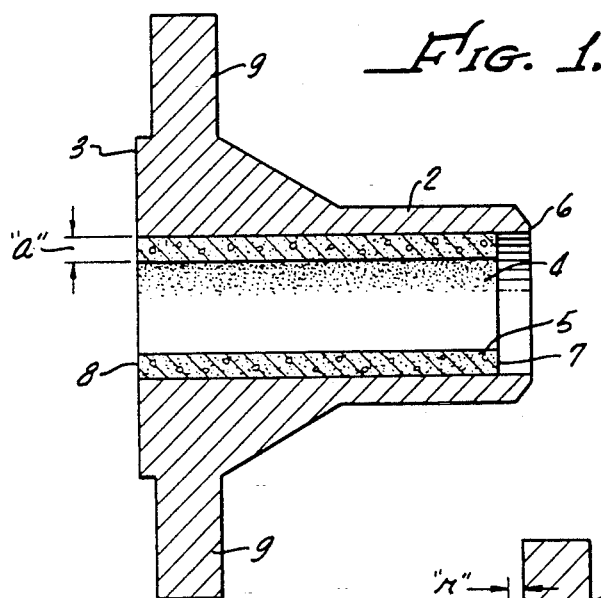
FIG. 1 shows a cross sectional side view of a flanged connector.

FIG. 1 shows a cross sectional view of a flanged connector for polymer concrete lined piping sections. An outer structural segment or conventional flange 2 is typically composed of carbon steel. The pipe fitting or flange 2 may also be composed of other structural materials capable of containing a fluid under pressure within the flange 2. The flange 2 provides a raised face or sealing surface 3 which sandwiches a seal ring and gasket (see FIG. 3) between mating flanges. The sandwiched gasket contains and seals a cylindrical fluid conducting passageway 4 extending within the piping sections.

The contained fluid may be a hard-to-handle flowing material, such as a scaling geothermal fluid, an acid, or an erosive slurry. The interior portions of the non-resistive flange 2 in fluid communications with the fluid within passageway 4 are covered and protected by a liner 5. The liner 5 in the preferred embodiment for handling a geothermal fluid is composed of a polymer concrete, but may alternatively be composed of cement, or other material which can withstand the effects of the fluid within the passageway 4.

The flange butt end 6 (located opposite to the flange face 3) is shaped and dimensioned to be butt welded to a mating end of a pipe section (see FIG. 2), thereby accomplishing a rigid pipe connection. However, the liner butt end 7 of liner 5 is set back from the flange butt end 6. This spacing of liner butt end 7 allows the dissipation of the high temperature (heat) generated during the welding process at the butt end.

The flange end liner face (or liner sealing surface) 8 of liner 5 extends radially inwardly from the planar raised face or flange sealing surface 3 of the flange 2. Alternative embodiments can provide a non-planar or set back liner sealing surface 8 extending inward from the inside diameter of the flange 2. The corresponding shape of the alternative seal ring and gasket (see FIG. 3) would mate with the alternative sealing surface shapes.

The outwardly projecting annular ear 9 of the flange 2 is rigidly bolted to an adjoining flange (bolts and bolt holes not shown for clarity). The raised face flange connector allows distortion of the flange ears after bolting, without significantly distorting the raised face flange sealing surface. Alternative embodiments can clamp or otherwise secure the adjoining sealing surfaces to sandwich a gasket (see FIG. 3) and seal the fluid within passageway 4.

The thickness "a" of liner 5 extends inwardly from the internal walls of flange 2 to the liner interior diameter, which form the walls of the fluid passageway 4. The minimum liner thickness "a" is a function of several design variables, including piping size and geometry, liner materials of construction and strength, harshness of the flowing materials within passageway 4, and piping system design life.

Figure 2:
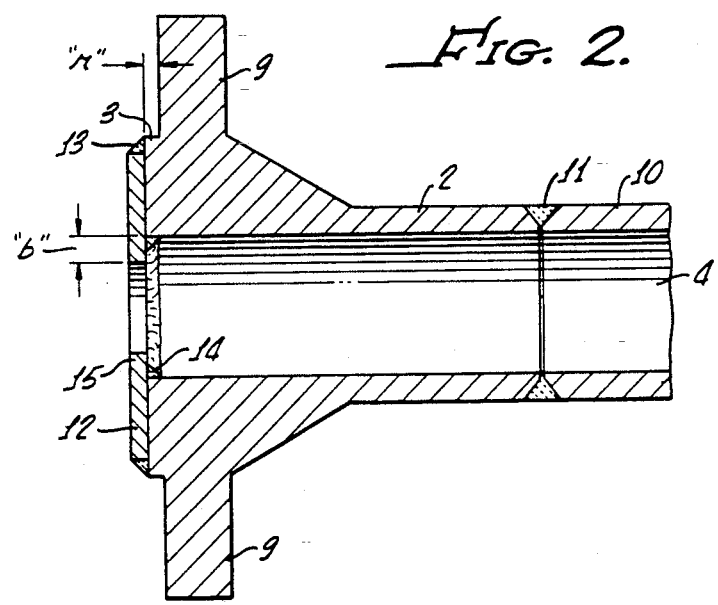
FIG. 2 shows the cross sectional view of the preferred flange connector during assembly.

FIG. 2 shows the cross-sectional view of an intermediate configuration of the preferred flanged joint. The flange 2 has been butt welded to a pipe (or other duct-like) section 10 prior to lining (see FIG. 3) the flange and pipe. This post-welding liner assembly avoids heat damage to the lining. The full penetration weldment 11 attaches the pipe section 10 in a manner which provides a full strength connection.

Seal ring 12 for the preferred embodiment in a geothermal fluid system application is composed of a stainless steel alloy material which is also weldable to the flange 2. Seal ring 12 is shown after being ring seal welded to the flange 2 at two areas. The flange face weldment 13 and interior weldment 14 provide a redundant fluid seal (on one side) and a structurally strong attachment. The materials and methods are chosen to avoid (welding) heat warping the flange sealing surface or seal rings. Alternative means for attaching and locating the seal ring may be desirable or required for non-weldable gasket materials. Alternative seal ring materials include brass. These alternative materials may be required to prevent galvanic corrosion in adjoining flange faces or provide adequate bonding and thermal expansion performance. Alternative attachment and locating means include: adhesives, mechanical clips (or snaps), clamping, and weld area reliefs.

The seal ring 12 differs from conventional flange face seal rings or gaskets by the inward protrusion 15. The inwardly extending dimension "b" of protrusion 15 (towards the centerline of passageway 4) is selected to generally match the thickness of the liner "a" (see FIG. 1), but alternative embodiments may protrude to cover only a portion of the liner sealing surface 8 (see FIG. 1) or project into the flow passage.

A nominal seal ring 12 thickness "c" is 0.32 cm ($\frac{1}{8}$ inch) for geothermal applications and for tubing/pipe sizes ranging from approximately 25 to 61 cm (10 to 24 inch). However seal ring 12 thickness "c" is expected to vary in other applications.

The thickness "r" of the raised face 3 can also vary. The raised face can be machined flush (i.e., "r" is zero). As shown, the raised face thickness "r" is generally equal to the gasket thickness "c."

The exposed face of the seal ring 12 is machined flat to a phonographic (grooved) surface finish in the preferred embodiment. This finish improves sealing reliability. The interior passageway 4 may also require machining or grinding, for example to remove weld bead 11 excess material and to obtain a honed finish near the flange face.

Figure 3:
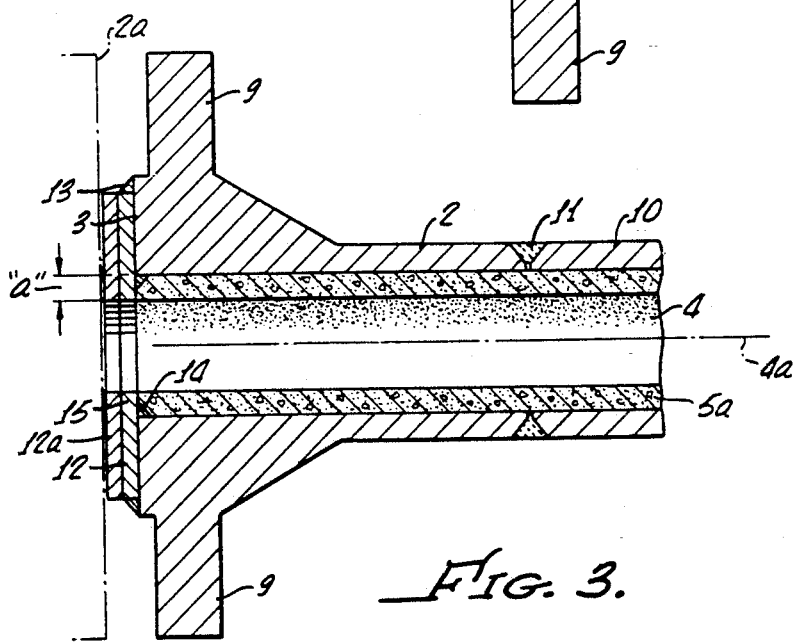
FIG. 3 shows a cross sectional view of the preferred flange connector shown in FIG. 2 ready for joining.

FIG. 3 shows a cross sectional view of the flanged connector shown in FIG. 2 after lining and ready to be mated to an adjoining flanged connector 2a (partially shown dotted for clarity). The interior surfaces of flange 2 are covered by a polymer concrete liner 5a. The liner has a thickness "a" which coincides with the dimension "b" of the protruding section 15 of the seal ring 12. As shown, the adjoining flanged connector 2a does not include a seal ring 12 or attached pipe, but alternative mating flanges may include a seal ring 12 and be attached to a second pipe section.

In the preferred embodiment, a deformable gasket 12a has been provided. The gasket is composed of a flexitallic material which is sandwiched between seal rings/flange faces of mating connectors (see FIG. 3). The seal ring 12 is generally rigid, diverting face seal loads to the steel flange 2.

In an alternative simplified embodiment, the ring seal 12 is less rigid (i.e., deformable), eliminating the need for the gasket 12a. The seal ring directly mates with (i.e., is sandwiched between) the interfacing flanges. In this alternative embodiment, a single deformable seal ring 12 serves to seal the interfacing flange face 3 and liner face 8 (see FIG. 1) surfaces, as well as filling the gap to create a smooth fluid flow surface.

The liner 5a covers both the flange and pipe section interior surfaces. The seal ring 12 and gasket 12a radially interior dimensions and post-welding application to pipe and flange provide a smooth fluid contacting surface for passageway 4. This results in minimum flow turbulence and improved resistance of the liner to abrasive or other hard-to-handle fluids.

The post-welding liner 5a shown in FIG. 3 differs from the pre-lined embodiment shown in FIG. 1 by avoiding the butt end liner edge sealing problems. However, the preferred post-welding liner application may not be possible for some flanged joint and piping configurations. For these pre-lined configurations, the set-back butt weld liner end shown in FIG. 1 is used to protect the liner 5 during welding.

The present invention's flange to seal ring outer and inner weldments 13 and 14 can reduce seal ring 12 existing (or heat induced) distortion by radially pulling the gasket during cooling. The undistorted surface again provides a reliable seal when the gasket 12a (or seal ring 12 in an alternative embodiment) is sandwiched between adjoining flanges. Seal ring seal weldments may also aid in positioning to avoid high liner edge stress zones. This reduction in the risk of liner overstress can improve joint reliability.

An alternative embodiment may provide a small set back dimension (along passageway centerline 4a) at the liner sealing surface 8 (see FIG. 1) to further limit compressive seal loads on the liner 5a. A deformable seal ring 12 is used to seal the set back liner sealing surface, again avoiding the need for gasket 12a while limiting liner edge and corner loads. Still further gasket/seal ring alternatives to prevent unacceptable liner stresses include: having the liner contactable portion (inner) of the seal ring be composed of materials softer than the (outer) remainder of the seal ring; having the flange face contactable portion of the seal ring hardened; and having a raised ring at the center (or a convex surface on the liner contactable portion) of the gasket to minimize corner stress at the liner edges. A raised ring or convex surface on the liner sealing surface 8 (see FIG. 1) would similarly reduce liner corner and edge stresses.

The primarily functions of the seal ring and gasket with respect to the liner are to fill the gap between liner edges, covering and protecting these brittle liner edges without overstressing the brittle liner. Depending upon the liner edge spacing, gasket (or seal ring) deformability, liner strength, and sealing loads, the gasket and/or seal ring may also pressure seal the liner edges, providing redundant seal capability (i.e., liner seal portion may contain pressurized fluids even if the flange face seal portion fails). Even if the gasket and/or seal ring cannot fully seal the liner edges, the gap filling and liner edge covering functions limit the fluid exposure and contact with the carbon steel (i.e., non-fluid-resistant) flange, and minimize the accompanying adverse erosive and fluid communication effects (i.e., corrosion) of the flowing hard-to-handle fluid.

The gasket (or gasket portion covering the liner edge) may be a plastic or elastomeric material. Materials which can withstand elevated geothermal applications include PTFE or Y267 EPDM available from the L'Garde Corporation.

FIG. 4 shows the preferred process of joining the pipe sections shown in FIGS. 2 and 3. After assembling components, step A first butt welds (attaches) one end of the flat faced flange connector to one end of a pipe section (see weldment 11 in FIG. 2). Although TIG welding is the preferred welding method, a variety of welding methods may be employed to achieve a full penetration butt weld.

The seal ring is shaped by machining to size at step B. The internal dimension of the gasket is set equal to the expected liner internal dimensions. Seal ring face is machined to a phonographic finish. Gasket thickness is generally equal to the 0.32 cm (⅛ inch).

The seal ring is double ring seal welded (placed and attached) to the flange at step C (see weldments 13 and 14 in FIG. 2) Two seal ring welds are made in the preferred embodiment, but alternatives are also possible, such as adhesives or tack welds.

The pipe and connector structure are prepared for liner application in step D. This can include mounting the structure in a spinning fixture, providing drainage for excess liner slurry water, and additional machining or sealing surface preparation.

Polymer concrete slurry can be hand troweled onto the interior surface of the attached flange and pipe at step E. However, the preferred method of applying the slurry is mechanically feeding and spinning the slurry until set. The feeding and spinning evenly cover exposed (unplugged) interior surfaces of the structure. The centrifugal forces tend to compact and aggregate the slurry, creating a centrifugally level (i.e., generally smooth) circular plane and removing bubbles. Excess water may also be removed and drained during spinning. Other fluid-resistant setting or hardenable materials can be used for the liner in other embodiments, such as cement. Alternative materials may also allow pumping of the slurry. After hardening, the lined flange and pipe is now ready for placing (and temporarily holding in place) the gasket and connecting (bolting) to an adjoining flanged section (see FIG. 5).

FIG. 5 shows a cross sectional view of a portion of one butt weld end used when the lining must be applied before butt welding. The carbon steel pipe 10 has a butt end fitting 16 similar to the flange butt end fitting 6 of FIG. 1). The butt end 16 is prepared for butt welding to a mating pipe or flange end fitting (see FIG. 7). A liner 5 covers the interior of the pipe 10 except for an end set back portion 17. A sealing compound (or other putty-like material) 18 is applied to the butt end liner sealing surface 19 during joining.

The butt end liner sealing surface 19 is recessed a distance "d." The recessed liner sealing surface can be formed by placing a removable dam or plug within the flange 2 at the butt end. The liner slurry is then fed into and/or spun against the dam or plug. Upon setting (hardening) of the liner and removal of the plug or dam, the butt end liner sealing surface 19 is exposed.

FIG. 6 shows a cross sectional view of a portion of a mating pre-lined butt end portion of a pipe, fitting or flange. The butt end of the low carbon steel flange 2 is prepared for butt welding similar to the pipe end 16 (see FIG. 5). A concentric sleeve 20 is attached to the interior of flange 2 by a sleeve seal weldment 21. The outside diameter of the carbon steel sleeve 20 is less then the inside diameter of the flange 2, creating a spaced apart distance "e." The sleeve extends beyond the edge of the butt end of the flange a certain axial distance "f." This sleeve extension distance "f" is slightly less than recess distance "d" (see FIG. 5) to leave a gap between the liner edges. Sleeve extension distance "f" is approximately 2.5 centimeters (1 inch) in the preferred embodiment. Alternative embodiments may step or cone the liner edges to create overlapping, sliding, or abutting liner edges.

After the sleeve 20 is attached, the liner 5 can be applied to the interior surfaces of the flange or pipe. The maximum thickness "a" (see FIG. 3) of the liner 5 is selected to allow a sufficient thickness of liner to cover and protect the non-fluid-resistant material sleeve 20. The liner thickness "a" is 1.3 to 1.6 cm (½ to ⅝ inch) in the preferred embodiment.

FIG. 7 shows a cross sectional view of the welded joint. The pipe 10 and flange 2 (or other pipe sections/- fittings) are attached by weldment 11. The carbon steel sleeve 20 acts as a barrier, conducting and dissipating welding heat away from the liner 5. The spaced apart and abutting distance "e" similarly protects the liner and allows a full penetration weldment 11. The sleeve extension distance "f" mates into the recess distance "d" (see FIG. 5) of the pipe section 10. The sealing compound 18 has been plastically deformed upon assembly, with the excess compound 18 squeezed into the passageway 4 (a part of which is shown in FIG. 7). The excess compound 18 can be wiped or otherwise removed prior to the flow of fluids in the passageway. The excess compound 18 can also be allowed to remain in place or flushed out by fluid flow during initial start up procedures. The seal weld 21 and sleeve 20 distribute and transfer the compound deforming loads on the brittle liner to the steel flange 2.

The adjoining butt weld ends are shown in FIG. 7 having equal cross sectional dimensions. Alternative embodiments may provide butt welded attachment between piping system components of unequal cross sectional dimensions or alternative weldments.

The sleeve and recess distance also provide a tortuous leakage path. The tortuous leakage path adds to the reliability of the joint, minimizing exposure of the non-resistant materials to harsh fluids in the event of leakage of the sleeve seal weldment 21 and/or sealing compound 18. An alternative embodiment may have a sleeve that is threadably engaging or otherwise sealably contacting the mating pipe section or fitting. This alternative embodiment provides a redundant sealing capability for increased reliability.

In operation, the present invention provides several types of joints for different applications. All provide generally smooth interior joint transition surfaces to minimize erosion, cavitation, and exposure to hard to handle fluids. If possible, the liner is applied after the low carbon steel connectors are joined. If post-welding is not possible, the butt end connector of the flange is normally readily accessible for wiping excess material, patching and inspections to assure a smooth transition. The flanged joint after assembly is normally not as accessible, but still provides a smooth transition surface without post-assembly inspection, patching or wiping.

The invention's welded or flanged joints control liner edge loads and seal the low carbon steel structural material from the hard-to-handle fluids. The controlled liner loads allow the joints to withstand severe thermal expansion and operating pressure transients during start-up, shutdown, storage, transport, maintenance, inspection, assembly, and disassembly.

Still other alternative embodiments are possible. These include: a more tortuous leakage path at the gasketed or sleeved joint (e.g., a greater recess distance or a non-planar liner sealing surface at the flanged joint), providing a conical (or other bulbous shaped) sleeve in place of the cylindrical sleeve to aid in centering during mating, using a self centering or retained gasket to improve flange-joint mating and reliability, adding a ceramic or other insulating material layer to a carbon steel sleeve to form a composite construction sleeve to provide added thermal protection for the liner during welding, having a sleeve composed of ablative materials for still further liner thermal protection during welding, and having the sealing compound also applied to the male mating end to provide added seal redundancy.

The invention satisfies the need to provide connectors which can structurally and environmentally withstand severe environments at minimal cost. Conventional carbon steel flanges and modified seal rings and deformable gaskets are used in conjunction with a low cost carbon steel sleeve and an inert, but brittle liner to achieve a tough, low cost and reusable connector. Further advantages of the invention include: redundant pressure sealing reliability and low pressure loss (high flow efficiency).

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A joint for connecting first and second pipe sections containing a fluid, the joint comprising:
    a fluid conducting first flange attached to the first pipe section, the first flange generally composed of a structural material and having an interior passageway and an outwardly projecting first flange sealing surface;
    a liner substantially composed of a material not the same as said structural material and substantially covering the interior passageway of the first flange, said liner terminating in a liner sealing surface near the flange sealing surface;
    a second flange attached to one end of the second pipe section and having a second sealing surface capable of mating with the first flange sealing surface, wherein said second flange and said second pipe section are rigidly attached to said first pipe section when mated; and
    a deformable gasket positioned between the flanges to cover a portion of both flange sealing surfaces and at least a portion of the liner sealing surface when the flanges are mated, wherein the positioned gasket is capable of sealing fluid within the joint, and also separately capable of sealing the interior passageway from the fluid.

2. The apparatus of claim 1 wherein the first flange also comprises a seal ring also shaped to cover the first flange sealing surface and the liner sealing portion, said seal ring attached to the first flange near the first flange sealing surface.

3. The apparatus of claim 2 wherein the attachment of the first flange to the first pipe section is by means of a weldment.

4. The apparatus of claim 3 wherein a portion of the liner is spaced apart from the first flange proximate to the weldment.

5. The apparatus of claim 4 which also comprises a sleeve attached to the first pipe section and covering the spaced apart portion of the liner proximate to the weldment.

6. A connector apparatus for a first duct section containing a fluid, said apparatus comprising:
    a first fluid containing segment attached to said first duct section, said first segment having an interior passageway and a first segment sealing surface;
    a first liner substantially covering said interior passageway, wherein said first liner also comprises a first liner sealing surface;
    a second fluid containing segment having an interior surface and a second sealing surface adapted to mate with said first segment; and a gasket-type element adapted to exclude the passage of fluid at said sealing surfaces and cover at least a portion of said first liner sealing surface when said gasket-type element is sandwiched between said mated segments, wherein said gasket-type element is capable of limiting exposure of said interior passageway to said fluid when said segments are mated; and means for rigidly mating said segments.

7. The apparatus of claim 6 wherein said first segment also comprises a seal element shaped to cover said first segment sealing surface and said liner sealing portion, said seal element is attached to said first segment near said first segment sealing surface, wherein said seal element attachment is independent of said mating means.

8. The apparatus of claim 7 which also comprises a second duct section attached to said second segment and having a second liner substantially covering said interior surface of said second segment.

9. The apparatus of claim 8 wherein said means for mating comprises bolting said adjoining connector to sandwich said gasket type element between said seal element and said second segment.

10. The apparatus of claim 9 wherein said first segment is a first flange and said first flange sealing surface is generally coplanar with said liner sealing surface.

11. The apparatus of claim 10 wherein the attachment of said first segment to said first duct section is by means of a weldment.

12. The apparatus of claim 11 wherein a portion of an outwardly facing liner surface of said first liner which is proximate to said weldment is spaced apart from said first segment.

13. The apparatus of claim 12 which also comprises a sleeve covering a portion of said spaced apart liner surface.

14. A joint apparatus for connecting two fluid conducting duct sections, said joint comprising:
a first ported outer segment having an end sealing surface and an interior passage surface, said first outer segment attached at an abutting interfaces to one end of a first of said duct sections;
a second ported outer segment is attached having an end sealing surface and attached to one end of a second of said duct sections, wherein said second outer segment is capable of mating with said first outer segment at said sealing surfaces, said first segment and said second segment being rigidly attached when mated;
a first inner segment having an exterior surface generally covering at least a portion of said interior passage surface, said first inner segment having an interior fluid conducting passageway; and
a sleeve segment covering a distal portion of said exterior surface of said first inner segment, wherein said sleeve is radially spaced apart from said interior passage surface proximate to said abutting interface.

15. The apparatus of claim 14 wherein said first outer segment is attached to said first duct section at said abutting interface by means of a weldment.

16. The apparatus of claim 15 which also comprises a seal element attached to said end sealing surface of at least one outer segment.

17. The apparatus of claim 16 which also comprises a gasket-type element capable of being sandwiched between said seal element and one of said outer segment and sealing surfaces.

18. A joint apparatus for conducting a fluid between connected duct sections comprising:
a first segment for conducting fluid attached to a first duct segment, said first segment having an outer structure including a first interface surface at one end, and said first segment further having an inner liner in communication with said fluid, and wherein a portion of said inner liner near said end is spaced apart from said outer structure;
a second fluid conducting segment attached to a second duct section and having a second interface surface rigidly mated to said first interfaced surface, wherein said segments are capable of forming a joint when exposed to heat;
means for heating said abutting joint segments; and
means for protecting said inner liner from exposure to said heating means.

19. The apparatus of claim 18 wherein said second segment so comprises an outer structure having an interior surface and has an inner liner which generally covers said interior surface except near said second interface surface, wherein said exposure to heat at said second interface surface does not damage said second liner.

20. The apparatus of claim 19 wherein said means for protecting comprises a sleeve covering said spaced apart portion of said inner liner.

21. A joint for connecting first and second duct sections containing a fluid-like substance, the joint comprising:
a flange segment rigidly attached to said first and second duct sections, the flange segment generally composed of a structural material and having an interior passageway from a first end to a second end, and outwardly projecting sealing surface at the first end and a duct attaching surface at the second end;
a liner substantially composed of a fluidresistant material not the same as said structural material and covering at least a portion of the interior passageway of the flange segment, said liner terminating in a liner end surface near the sealing surface;
a flange mating segment having a mating sealing surface capable of being positioned proximate to the sealing surface;
a deformable gasket capable of sealing when positioned between, and deformed by, the sealing and mating surfaces, wherein the positioned gasket is also capable of sealing the interior passageway at said liner end surface; and
a sleeve segment covering a portion of said exterior surface of said liner, wherein said sleeve is radially spaced apart from a portion of said interior passageway proximate to said duct attaching surface.

* * * * *

UNITED STATES PATENT AND TRADEMARK OFFICE
CERTIFICATE OF CORRECTION

PATENT NO. : 5,163,715

DATED : Nov. 17, 1992

INVENTOR(S) : Rickard et al.

It is certified that error appears in the above-identified patent and that said Letters Patent is hereby corrected as shown below:

Claim 14, column 9, line 46, delete "interfaces" and insert therefor -- interface --; [line 48, delete "is attached"].

Claim 21, column 10, line 48, change "fluidresistant" to read -- fluid-resistant --.

Signed and Sealed this

Twenty-fifth Day of January, 1994

*Attest:*

BRUCE LEHMAN

*Attesting Officer*   Commissioner of Patents and Trademarks